Feb. 6, 1940.  M. M. LEWBERS  2,189,399
ELECTRIC WELDING APPARATUS
Filed Feb. 6, 1937    8 Sheets-Sheet 1
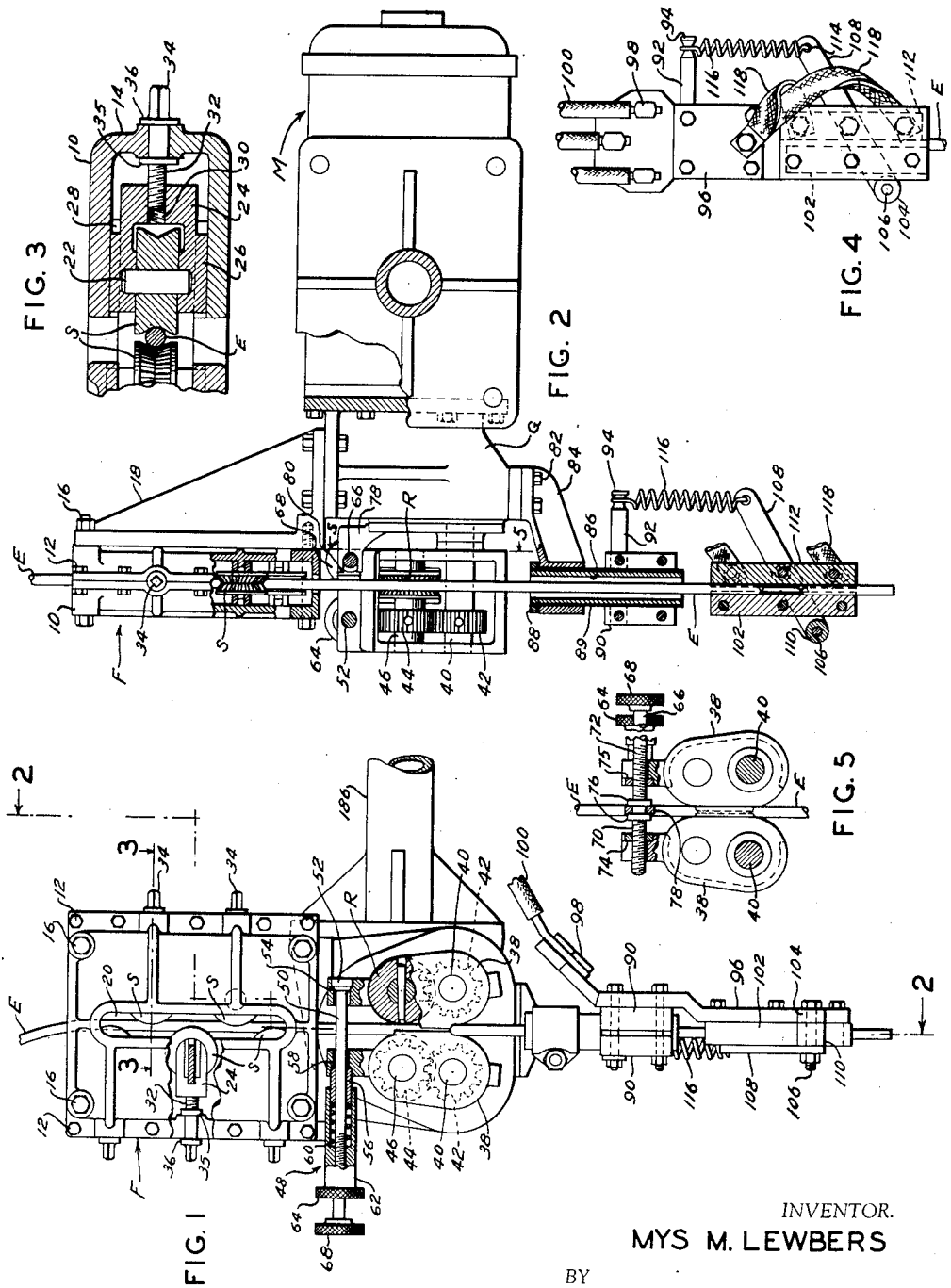
INVENTOR.
MYS M. LEWBERS
BY
Ed Greenewald
ATTORNEY.

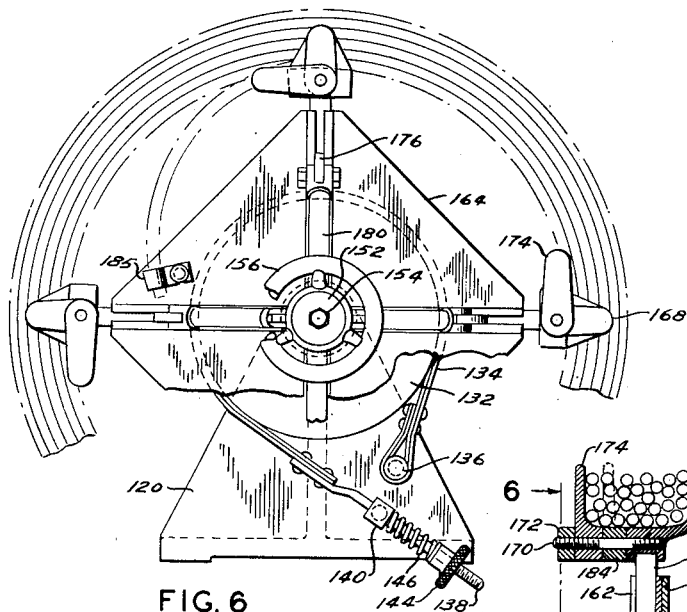

Feb. 6, 1940.  M. M. LEWBERS  2,189,399
ELECTRIC WELDING APPARATUS
Filed Feb. 6, 1937  8 Sheets—Sheet 3
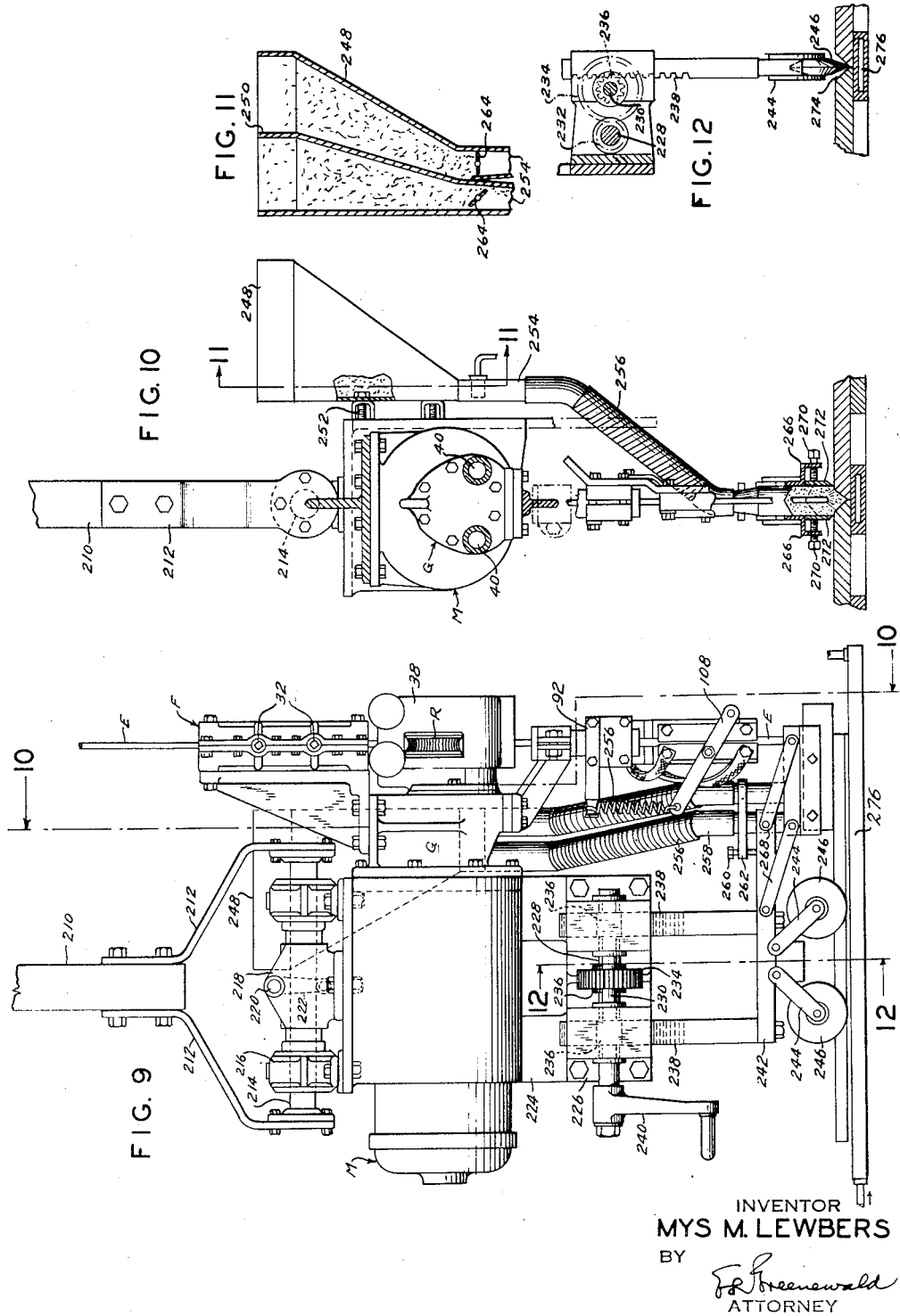
INVENTOR
MYS M. LEWBERS
BY
ATTORNEY Feb. 6, 1940.　　M. M. LEWBERS　　2,189,399
ELECTRIC WELDING APPARATUS
Filed Feb. 6, 1937　　8 Sheets-Sheet 4
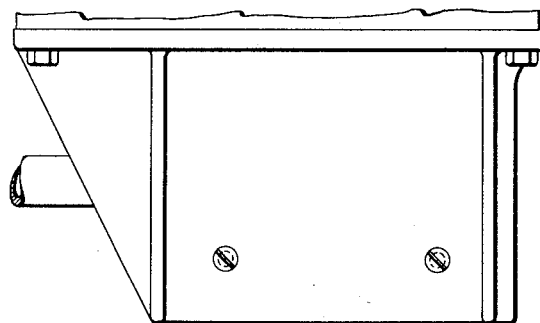
FIG. 13
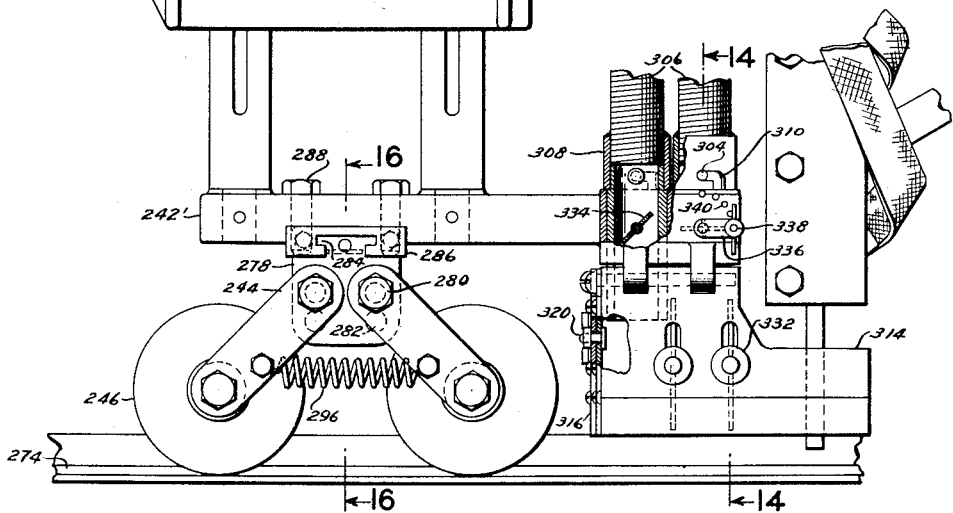
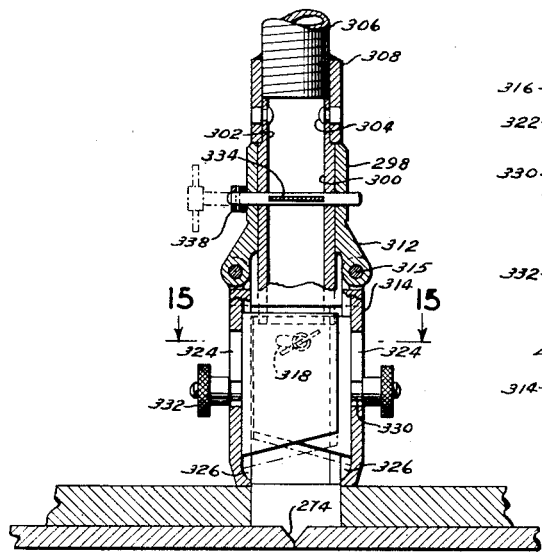
FIG. 14
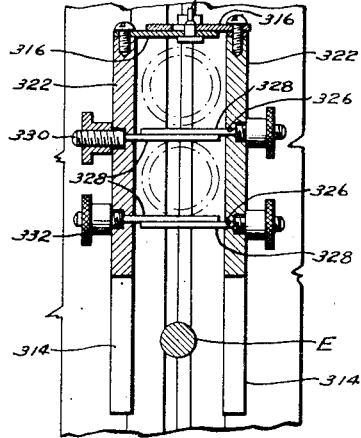
FIG. 15
INVENTOR
MYS M. LEWBERS
BY
E.E. Greenewald
ATTORNEY INVENTOR
MYS M. LEWBERS
BY
*E. L. Greenewald*
ATTORNEY Feb. 6, 1940.　　　　M. M. LEWBERS　　　　2,189,399
ELECTRIC WELDING APPARATUS
Filed Feb. 6, 1937　　　　8 Sheets-Sheet 6

INVENTOR
MYS M. LEWBERS
BY
ATTORNEY

Feb. 6, 1940.  M. M. LEWBERS  2,189,399
ELECTRIC WELDING APPARATUS
Filed Feb. 6, 1937  8 Sheets-Sheet 7

INVENTOR
MYS M. LEWBERS
BY
*Greenewald*
ATTORNEY

Feb. 6, 1940.  M. M. LEWBERS  2,189,399
ELECTRIC WELDING APPARATUS
Filed Feb. 6, 1937   8 Sheets-Sheet 8

INVENTOR
MYS M. LEWBERS
BY
   *Greenewald*
ATTORNEY

Patented Feb. 6, 1940

2,189,399

UNITED STATES PATENT OFFICE 2,189,399

ELECTRIC WELDING APPARATUS

Mys M. Lewbers, Bayside, N. Y., assignor to The Linde Air Products Company, a corporation of Ohio Application February 6, 1937, Serial No. 124,361

17 Claims. (Cl. 219—8)

This invention pertains to electric welding apparatus and more particularly to an improved welding machine adapted for completely automatic operation.

The welding machine of this invention is particularly adaptable to the welding process described and claimed in Patent No. 2,043,960, issued on June 9, 1936, to Jones et al. In the process disclosed and claimed in this patent, welding is accomplished by passing a high amperage electric current from an electrode to the work to be welded through an inorganic, high resistance welding material substantially free from substances evolving deleterious amounts of gases; which material is heaped on the line to be welded in such quantities as to completely submerge the welding operation under a blanket of the welding material. Any unfused portion of this welding material may be recovered from the finished portion of the weld and be used again.

Among the objects of the invention are to provide a welding machine adapted to feed a continuous welding electrode to the work automatically; to provide support, guiding and adjustment means to maintain the welding electrode in the proper position relative to the work; to provide means for automatically insuring the provision of the proper amount of welding material adjacent the electrode; to provide means to reclaim unused welding material; and to provide an improved welding machine substantially completely automatic in operation.

These and other objects of the invention will become apparent from the following description when read in connection with the accompanying drawings, in which:

Fig. 1 is a front vertical view of one form of welding head embodying this invention;

Fig. 2 is a section on the line 2—2 of Fig. 1;

Fig. 3 is a section on the line 3—3 of Fig. 1;

Fig. 4 is a fragmentary end view of the lower portion of Fig. 1;

Fig. 5 is a section on the line 5—5 of Fig. 2;

Fig. 6 is a fragmentary section, on the line 6—6 of Fig. 7, of a reel which may be used with this invention;

Fig. 7 is a vertical fragmentary mid-section of the reel shown in Fig. 6;

Fig. 8 is a vertical view showing one adaptation of the welding machine with the reel shown in Figs. 6 and 7 for the production welding of heavy plates;

Fig. 9 is a side view of a modified form of the invention;

Fig. 10 is a section on the line 10—10 of Fig. 9;

Fig. 11 is a section on the line 11—11 of Fig. 10;

Fig. 12 is a section on the line 12—12 of Fig. 9;

Fig. 13 is a side view of another modification of this invention;

Fig. 14 is a section on the line 14—14 of Fig. 13;

Fig. 15 is a section on the line 15—15 of Fig. 14;

Figure 16:
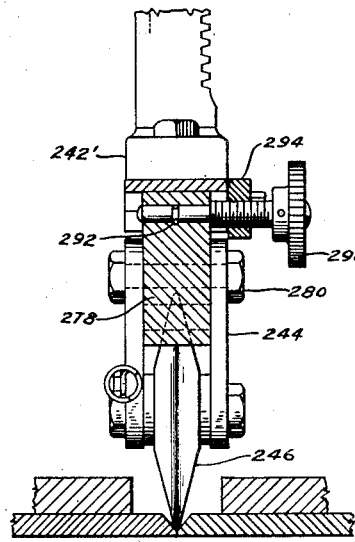
Fig. 16 is a section on the line 16—16 of Fig. 13.

In the form of the invention shown particularly in Figs. 1 to 5, inclusive, the welding head comprises a rectangular housing F which encloses the welding rod or electrode straightening, feeding and guiding means, and is made of two identical castings 10, 10 bolted together by bolts 12. Castings 10, 10 are generally flat with turned over ends to make abutting flanges 14 and with reinforcing ribs on the outside, as shown in Fig. 2. The housing F is secured by bolts 16 to an L-shaped bracket 18 which in turn rests on a gear reducer G. An opening 20 is made in the flat portions of castings 10, 10 in order to observe the amount of adjustment and to facilitate reaching into the space between straightening rollers S and threading a welding rod or electrode E through the housing F.

Each straightening roller S is carried on a pin 22 mounted in a bearing block 24, the sides of which terminate in tongues 26 that cooperate with grooves 28 formed in the castings 10, 10. One end of each bearing block 24 is provided with a threaded hole 30 adapted to receive a threaded adjusting bolt 32 mounted in cooperating recesses formed in the castings 10, 10. Bolt 32, at its outer end, is squared as at 34 to receive a suitable adjusting wrench. Intermediate its ends, bolt 32 is provided with integral collars 35 and 36 adapted to engage opposite sides of flanges 14 to properly position bolt 32 in the housing F.

Gear reducer G is driven by a motor M suitably secured to one side thereof. On the opposite side of gear reducer G are swingably mounted two identical feeding roller housings 38, 38. Gear reducer G has two shafts 40, 40 extending therefrom on each of which is mounted a spur gear 42, and each spur gear 42 is disposed in one of the feeding roller housings 38. Each spur gear 42 drives a gear 44 keyed to a shaft 46. To each of these shafts is keyed an electrode feeding roller R, shown in detail in Figs. 30 to 33 inclusive, which cooperates with an opposing feeding roller to engage electrode E to move the same in both directions. Housings 38, 38 are each swingable about one of the shafts 40, and the tension of the feeding rollers R on the electrode E is adjustable by a tensioning device 48. Tensioning device 48 comprises a threaded member 50 having a head 52 engaged in a suitable recess 54 in one of the housings 38. Loosely mounted on member 50 is a sleeve 56 engaging at one side a recess 58 in the other housing 38 and at its opposite side a spring 60 mounted in a socket member 62 having a knurled head 64 and threadedly engaging the member 50.

Means for centering the housings 38, 38 with respect to the electrode E are provided and, as shown in Fig. 5, include a bolt 66 having a knurled head 68 and two oppositely threaded portions 70 and 72. Portion 70 threadedly engages a collar 74 loosely mounted in a recess in the left hand housing 38 (as viewed in Fig. 5) and portion 72 threadedly engages a similar collar 75 loosely mounted in a recess in the right hand housing 38. At the center of bolt 66 are two spaced collars 76, 76 adapted to engage opposite sides of a member 78 centrally attached to gear reducer G, and having an open-ended slot 80 therein through which the bolt 66 extends.

Bolt 66 is used to set the minimum center distance between the housings 38, 38. Spring tensioning means 48 resiliently maintains the rollers R in contact with electrode E by causing the recesses in housings 38, 38 to engage the collars 74 and 75 threaded on the bolt 66.

Secured to the underside of gear reducer G by bolts 82 is an arm or bracket 84 which has an opening in its opposite end in which is disposed a sleeve member 86 surrounding the electrode E and secured in position relative to arm 84 by a collar 88. Suitable insulating material 89 is disposed between arm 84, sleeve 86 and collar 88. Clamped to the lower end of sleeve 86 are two plates 90, 90. Bolted to one plate 90 is an arm 92 having a reduced portion 94 adjacent its outer end. A terminal plate 96 is secured to the other plate 90, and, on the upper end of plate 96 is a series of cable terminals 98 to receive electric conductors 100. Adjacent the lower end of plate 96, to which is bolted a fixed grooved contact jaw 102, is an apertured ear 104, having passed therethrough a bolt 106, to the opposite end of which is pivotally secured an arm or lever 108. Surrounding bolt 106 between ear 104 and arm 108 is a sleeve 110. Arm 108 is slidably and pivotally connected to a movable grooved contact jaw 112, and has an aperture 114 in its outer end to which is secured a spring 116 which is fastened at its opposite end to the reduced portion 94 of arm 92. Flexible current carrying means 118 are fastened to terminal plate 96 and movable jaw 112.

From the above description of the assembly of the parts of the improved welding machine of this invention, the operation will be readily understood. Electrode or welding rod E is threaded into housing F between straightening rollers S which are individually adjusted, through the medium of bolts 32, to insure all twists being removed from the electrode before it passes between the feeding rollers R. Bolt 66 is first adjusted to properly position housings 38, 38 with respect to electrode E and in accordance with the size of the electrode being used. This member is provided with a right hand threaded portion 70 and a left hand threaded portion 72, so that by turning knurled head 68 on bolt 66, the housings may be adjusted the requisite distance apart to accommodate the size of welding electrode being used. Tensioning means 48 is then adjusted so that feeding rollers R exercise the proper pressure on electrode E. From the feeding rollers the electrode is passed through sleeve 86 and between contact jaws 102 and 112. Spring 116, through the medium of arm 108, causes movable jaw 112 to resiliently contact the electrode E and thus resiliently urge the electrode into contact with fixed jaw 102. Electric current from conductors 100 is conducted through terminals 98 and terminal plate 96 to fixed contact jaw 102, and is independently conducted to movable contact jaw 112 from plate 96, by flexible current carrying means 118. When the electrode E is properly positioned in the welding head, motor M may be energized either automatically or manually to drive, through the medium of gear reducer G, shafts 40, 40 which, through the train of gears above described, drive feeding rollers R to feed the electrode E between the spring pressed contact jaws 102 and 112 to the work.

Due to the relatively large size of the grooved contact jaws 102 and 112, large current densities can be used in the welding operation without excessive overheating. As a consequence, no cooling means are required for the contact jaws even when currents in excess of 4000 amperes are passed therethrough. The separate flexible current carrying means 118 are provided to insure a positive current carrying path to the movable contact jaw 112. A further advantage of the large contact jaws is the ability to pass therebetween welding electrodes of much larger diameter than can be used in automatic welding machines now known.

A reel of welding wire or rod, suitable for use with the above described welding machine, is shown in Figs. 6 and 7. The reel assembly comprises a support 120, having a horizontal bore 122 in its upper end in which is mounted one end of a shaft 124 and suitable bearing bushings 126. Shaft 124 has an integral collar 128 in its median portion, which engages one end of bore 122, and to the end of the shaft disposed through bore 122 is fixedly secured a removable collar 130 which engages the opposite end of the bore so that collars 128 and 130 properly position shaft 124 in bore 122 of support 120.

Rigidly secured, as by welding, to the collar 128, is a brake drum 132, engaged by a brake band 134 secured in fixed relation at one end to support 120 by a bolt 136. At its opposite end, brake band 134 is secured to an adjusting bolt 138 extending through a sleeve 140 secured to support 120 by a bolt 142 integral with said sleeve. The opposite end of adjusting bolt 138 is threaded to receive a nut 144, and a spring 146 surrounds adjusting bolt 138 between sleeve 140 and nut 144.

Shrunk on the outer end of shaft 124 is a sleeve 148 which has an enlarged portion 150 extending partly over collar 128 and firmly abutting brake drum 132. Sleeve 148 is secured against longitudinal movement on shaft 124 by washer 152 and screw 154 and is externally threaded to receive a threaded handwheel 156.

Enlarged portion 150 of sleeve 148 has formed therein a plurality of circumferentially spaced recesses 158 in which are secured, as by welding, a plurality of tubes 160 each having a slot 162 cut therein at one end. Welded to sleeve 148 adjacent recesses 158 is a rectangular backing plate 164 which is secured to the tubes 160. Slidable in tubes 160 are arms 166 to the outer ends of which are attached L-shaped brackets 168. Secured to brackets 168 by threaded bolts 170 and nuts 172 are other L-shaped brackets 174 adapted to pivot relatively to brackets 168. Rigidly secured to arms 166, and movable in slots 162, are ears 176 to which are pivotally secured arms 178 which slide in socket members 180 pivotally secured to ring 182 which is loosely mounted on sleeve 148 and abuts handwheel 156. Arms 178 may be adjusted relative to socket members 180 by means of corresponding holes therein adapted to receive removable pins.

In operation, when a coil of welding rod or wire is to be placed on the reel, the diameter of the latter is roughly adjusted to correspond to the inside diameter of the coil by adjusting arms 178 in socket members 180. Nuts 172 are then loosened and brackets 174 are turned radially inwardly. The coil is then placed upon the reel, and, if desired, spacing means 184 may be placed between brackets 168 and brackets 174. Brackets 174 are then turned radially outwardly, nuts 172 tightened, one end of the coil of welding electrode wire is secured to plate 164 by a clamp 185 and handwheel 156 turned to expand the reel against the coil. The opposite end of the coil of the welding electrode wire is fed into the welding machine, brake band 134 is tightened against brake drum 132, and the binding of the coil removed.

Fig. 8 shows the reel mounted to cooperate with the improved welding machine of the invention in the production welding of heavy plate.

The reel may be mounted on an arm 186 to the outer end of which is secured the welding machine. The work to be welded is disposed upon a relatively movable support 188 and guides 190, 190 are provided to retain the granular welding material 192 in place on the welding line, such as the welding groove or V 194. Arm 186 is slidable in a sleeve 196 which is pivotally secured to a rotatable and vertically movable plunger 198 mounted in a suitable support 200. To the end of arm 186 opposite the machine is secured a counterweight 202. By the above described construction, the welding machine is capable of universal adjustment. In operation, brake band 134 is adjusted to give the proper amount of retarding action to prevent the coil of welding electrode wire unreeling faster than necessitated by the amount of electrode wire fed through the welding machine to the work.

A modified form of this invention is shown in Figs. 9 to 12. In this modification, the welding machine or device is pivotally suspended from a fixed or travelling support by a hanger 210 which is secured by straps 212 to a shaft 214. The casing or motor M is pivotally mounted on shaft 214 by bearings 216 and may be secured or locked in any adjusted position thereon by a clamp 218 fastened to the motor and actuated by a threaded bolt 220 provided with a suitable handle 222. Means to guide the machine along a line to be welded are provided and include a plate 224 depending from the underside of the casing of motor M and having attached thereto a double bracket 226. Bracket 226 has mounted therein shafts 228 and 230 having keyed thereto co-operating gears 232 and 234, respectively. Also keyed to shaft 230 are two gears 236, 236 which engage rack means 238, 238 slidable in recesses in bracket 226. Operating handle 240 is keyed to shaft 228. Racks 238, 238 are each bolted to a plate or other support 242 on which are hingedly mounted, by means of links 244, guide wheels 246.

A hopper 248 for granular welding material, provided with a partition 250, is secured to the welding machine by bolts 252, and depending from each half of the hopper is a tube 254 connected by flexible tubing 256 to a tube 258 adjustably supported on plate 242 by an adjusting screw 260 engaging a bracket 262 attached to tubes 258. A butterfly valve 264 is disposed in each of the tubes 254. Z-shaped plates 266 are swingably secured by pairs of links 268 to plate 242 and each has mounted thereon by a bolt 270 a laterally adjustable, vertically extending plate 272.

In operation, the above described machine moves from right to left relatively to the work, as shown in Fig. 9. The guide wheels 246 are placed on the line to be welded, such as a welding groove or V 274 and the height of the machine relative to the work is adjusted by means of handle 240, shaft 228, gears 232, 234, shaft 230, gears 236, 236 and racks 238, 238. Due to the pivotal connection of hanger 210 with the machine, the latter may swing laterally about an axis parallel to the line to be welded or welding groove in response to the guide wheels following irregularities in the welding groove. Granular welding material is placed in the hopper 248, reclaimed material being placed in one section and new material in the other. The amount of material deposited on the work is controlled by the valves 264 and the plates 272 retain the material in place on the work. Electric current, passed from jaws 102, 112 through electrode E and the welding material to the work, fuses the welding material, which in turn causes fusion of the work and the welding electrode E. If desired, the work may be moved relatively to the machine. A cooling means comprising a conduit 276, through which cooling fluid may be passed, may, if desired, be disposed in contact with the work beneath the welding line.

The clamping means 218 for the hinge suspension is used when approaching the end of the weld; in which instance the guide wheels have no groove to follow. The welding machine is then clamped in position against swinging movement during the final portion of its travel.

A preferred embodiment of this invention is shown in Figs. 13 to 16. In this embodiment guide wheels 246 are adjustably attached by links 244 to a supporting block 278 which is secured to plate 242' for lateral adjustment thereon. Links 244 are secured to block 278 by means of bolts 280 which may engage in any one of a series of holes 282 in block 278. Block 278 is provided with a T-slotted head 284 which cooperates with a correspondingly grooved plate 286 attached to plate 242' by bolts 288. Block 278 may be laterally adjusted on plate 242' by means of screw 290, which is secured by a ring and groove connection 292 to block 278 and threadedly engages a block 294 rigidly secured to plate 242'. Vertical adjustment of the guiding means is accomplished by a rack and gear device similar to that previously described and shown in Figs. 9 and 12. Spring 296 extending between and attached to links 244 serves to maintain guide wheels 246 in contact with the welding groove 274.

A modified form of distributing means for granular welding material is attached to one end of plate 242' and comprises a pair of sleeves 298 secured in suitable openings in plate 242'. A tubular member 300 is disposed inside of each sleeve 298 and provided with a reduced portion 302 having secured thereto rivets 304. Two conduits 306 are each provided with a collar 308 and each collar has therein bayonet slots 310 for engagement with rivets 304 to secure the conduit to one of the tubular members 300. Each sleeve 298 is provided at its lower end with a hinge portion 312, to which hinge portions a welding material distributing gate 314 is secured by a hinge pin 315. Each gate 314 comprises a pair of vertically extending members disposed at right angles to each other, one member extending parallel to the welding groove and the other member extending at right angles thereto as shown in Fig. 15. The portion 316 of each gate 314 which extends at right angles to the welding line is provided with an arcuate slot 318 in registry with an arcuate slot in the corresponding portion 316 of the opposite gate. Connecting the two right angle portions of the welding gates is a wing bolt 320 disposed through the slots 318, which serves to maintain the gates 314 in adjusted position. The side portions 322 of the gates 314 are each provided with two slots 324 and two grooves 326, each groove registering with one of said slots. Slidably fitting in each groove 326 is a welding material control gate 328 provided with a pin 330 mounted in the slot 324 and being threaded for engagement with a nut 332 to allow the gate to be held in vertically adjusted position. There are thus provided two pairs of gates, the members of each pair extending oppositely to each other and overlapping. Each gate is generally trapezoidal in shape with a bevelled lower edge, as shown in Fig. 14.

Disposed in each tubular member 300 above the welding material control gates is a butterfly valve 334 which is controlled by an arm 336 secured to the pivotal axis of the valve 334 and provided with a retractable pin 338 for holding the arm and valve in any desired position by engagement in one of a series of holes 340.

In the operation of the above embodiment, new granular welding material may be fed through one of the conduits 306 and reclaimed material through the other conduit. Control of the flow of the material is accomplished by means of the valves 334, and the amount and contour of the material disposed on top of the work is controlled by adjustment of the gates 328, there being a separate pair of gates 328 for the new material and for the reclaimed material.

The lateral adjustment means for the guide wheels 246 allows these wheels to be laterally offset from the center line of the welding electrode. This is often desirable as, for instance, when welding on a circular line or when welding a plate with a bevelled edge to one with a straight edge, in which case the wheels must necessarily be laterally offset from the welding line. The other operating parts of the machine disclosed in Figs. 13 to 16 are the same as those shown in Figs. 9 to 12, inclusive, and previously described.

Figure 17:
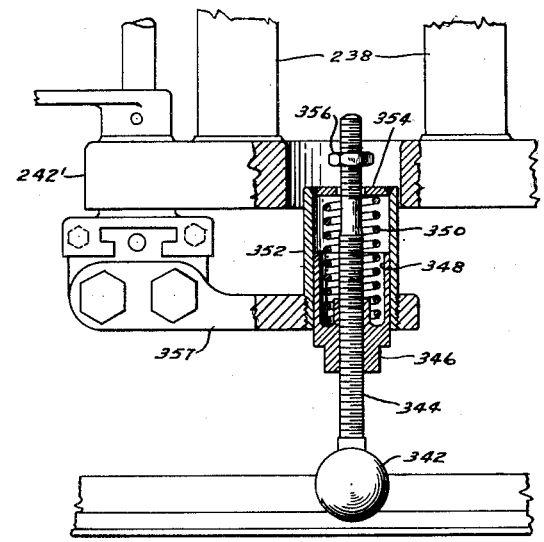
Fig. 17 is a side view, partly in section, of a modified form of guiding assembly for the machine shown in Fig. 13.
Figure 18:
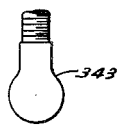
Fig. 18 shows a modified form of guiding head for use with the guiding assembly of Fig. 17.

In Fig. 17 is shown a type of guide means which may be substituted for the guide wheels 246, and which comprises a spherical member such as a ball 342 secured to a screw 344 for vertical adjustment. Screw 344 is threadedly secured to a tubular member or sleeve 346 which has a recess 348 therein adapted to engage one end of a spring 350 which is disposed in a guiding sleeve 352 in which the tubular member 346 may slide. The opposite end of spring 350 engages a collar 354 which is secured to the guiding sleeve 352 and a nut 356 may be secured on screw 344 to limit movement of the ball 342 in a vertical direction. The entire guiding assembly is secured to plate 242' by a horizontal arm 357 having a T-slotted head so that it may be interchangeable with the head supporting the guide wheels 246 (shown in Fig. 13).

Figs. 18, 19, 20, and 21 show modified forms of guiding heads interchangeable with the ball 342 of Fig. 17 so that the guiding device illustrated in Fig. 17 may be used with any of a variety of standardized welding vees. For instance, the guiding ball 342 shown in Fig. 17 is particularly adapted for use in the welding of plates two inches thick bevelled at an angle of 15°, and in welding two and one-half inch plates bevelled at an angle of 13½°. The somewhat smaller ball-shaped guiding head 343 shown in Fig. 18 may be used for welding one and one-quarter inch or one and one-half inch plates bevelled at an angle of 15°.

Figure 19:
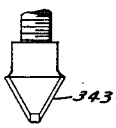
Fig. 19 shows another modified form of guiding head for use with the guiding assembly of Fig. 17.
Figure 20:
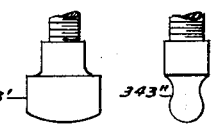
Fig. 20 is a side view of the guiding head shown in Fig. 19.
Figure 21:
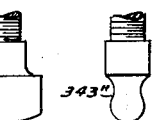
Fig. 21 shows still another modified form of guiding head for use with the guiding assembly of Fig. 17.

The wedge-shaped guiding head 343' shown in Figs. 19 and 20 is designed for use in welding one-quarter inch, three-sixteenth inch, three-eighth inch, seven-sixteenth inch and one-half inch plates bevelled at an angle of 30°. The small ball-shaped guiding head 343'' shown in Fig. 21 may be used in welding three-quarter inch plates bevelled at 22½° and one inch plates having a bevel of 17°. Since the above described welding heads are interchangeable, any one may be used in the guiding device of Fig. 17 depending upon the particular thickness of plates to be welded and the particular angle at which the plates are bevelled to form the welding vee.

Figure 22:
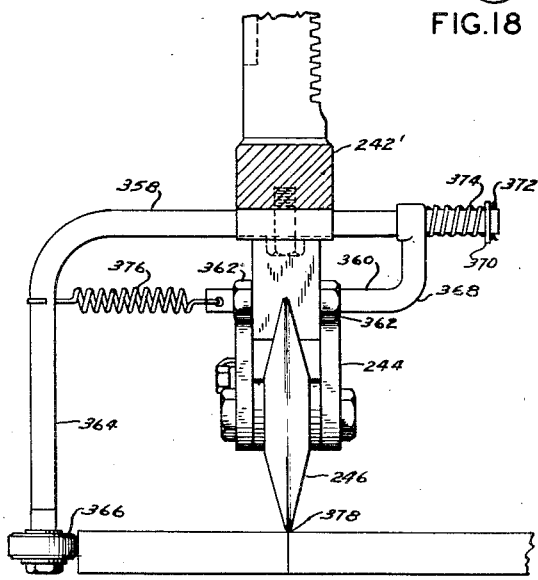
Fig. 22 shows another modified form of guiding assembly for use with the machine shown in Fig. 13.

Fig. 22 shows a modified form of guiding device which may be substituted for the guide wheels 246, or which may be used in combination therewith, when it is desired to make a weld when the members to be welded are so disposed that no opening is left therebetween to receive the guide wheels 246. This modified guiding device comprises an L-shaped bracket or arm 358 slidably mounted in the plate 242'. A second arm 360 is secured in one of the holes 282 in the block 278 attached to the plate 242', by two nuts 362, 362. Arm 358 is formed with a right angle portion 364 to which may be attached a roller or guide wheel 366 pivotal thereon and adapted to engage any suitable portion of the work to be welded, such as a plate edge, to guide the welding machine along the welding line. Arm 360 is formed at one end with a bent portion 368 having an opening therein slidably receiving the arm 358. The portion of the arm 358 extending beyond the bent portion 368 of the arm 360 has mounted thereon a washer 370 held against outward movement on the arm by a pin 372. Disposed between the bent portion 368 of the arm 360 and the washer 370 is a spring 374. This spring acts to urge the arm 358 to the right as shown in Fig. 22 and thereby maintain the guide wheel 366 rigidly in contact with the edge of the members to be welded. If desired a spring 376 attached at one end to the arm 360 and at the opposite end to the right angle portion 364 of the arm 358 may be substituted for the spring 374 and acts in the same manner as spring 374. The guide wheels 246 mounted on the links 244 are, in this instance, used only to support the welding machine in its movement along the welding line 378.

Figure 23:
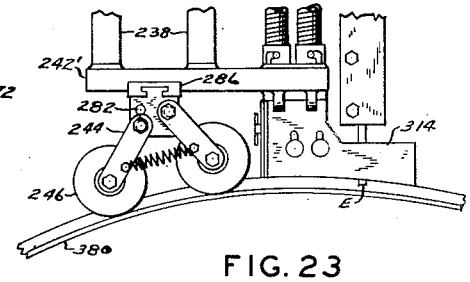
Fig. 23 is a view of the machine disclosed in Fig. 13 as adapted for welding large diameter pipes.

As shown in Fig. 23 of the drawings, if it is desired to make a weld on a curved surface, for instance on a large diameter pipe 380, the links 244 may be attached to any desired one of the holes 282 so that the guide wheels 246 may follow any degree of curvature desired. In this instance the gates 314 may be cut to correspond to the curvature in the material being welded.

Figure 24:
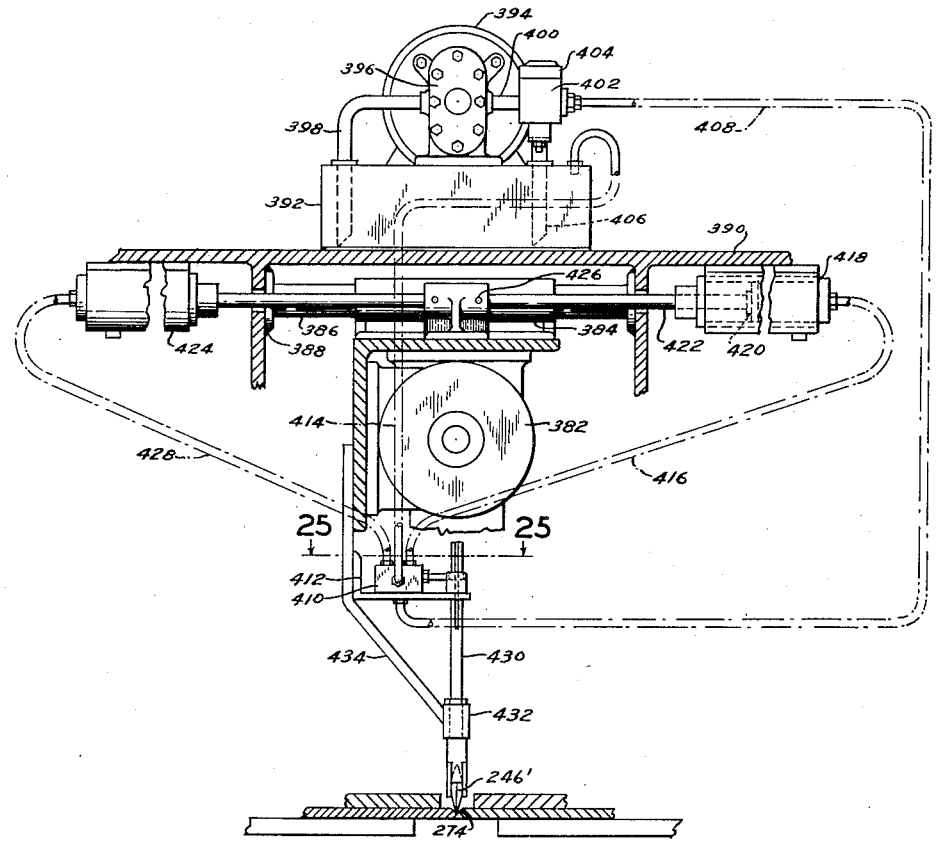
Fig. 24 shows a somewhat diagrammatic arrangement for hydraulically controlling the automatic guiding of the welding machine.
Figure 25:
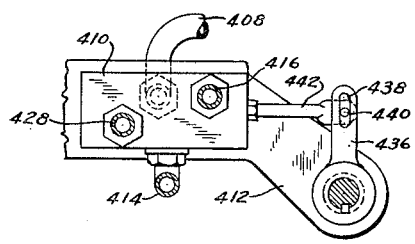
Fig. 25 is a section on the line 25—25 of Fig. 24.

Figs. 24 and 25 disclose a method of hydraulically controlling the position of the welding machine with respect to the welding line. As shown in these figures a welding machine or device generally designated as 382, and which may be of the type shown in the other figures of the drawings, is provided with a tubular bracket 384 attached thereto which surrounds a tubular member 386 which is in turn rigidly secured as by welds 388 to a main support 390. Disposed upon the main support 390 is a tank 392 adapted to contain oil or other suitable fluid for hydraulic transmission purposes. Mounted upon the tank 392 is a motor 394 driving a pump 396 which has attached thereto at one side a pipe 398 through which oil may be withdrawn from the tank 392. From the opposite side of the pump 396 a pipe 400 extends to a relief valve 402 upon which is mounted a pressure gauge 404. Extending from the relief valve 402 is a pipe 406 which returns excess oil to the tank 392. Also extending from the relief valve is a pressure line 408 leading to a four-way valve 410 which is adapted to be controlled by a suitable guiding means. Four-way valve 410 is attached to the welding machine 382 by a suitable bracket 412 attached to a second bracket 434. Extending from valve 410 is an oil return line 414 leading to tank 392, and an oil pressure line 416 which leads to a cylinder 418 provided with a piston 420 attached to a piston rod 422 which extends through the support 390 to the piston of an oppositely disposed cylinder 424 and has attached thereto a bracket 426 which is in turn secured to the welding machine 382. Extending between valve 410 and cylinder 424 is an oil pressure line 428.

Guide wheels 246' are supported by a rotatable rod 430 extending through a sleeve 432 attached by bracket 434 to the welding machine 382. Secured to the upper end of rod 430 is a crank 436 having a slot 438 therein which is adapted to cooperate with a pin 440 secured to a valve actuating rod 442 which extends into valve 410.

In operation as guide wheels 246' move along the welding groove 274 and, as they swing to either the right or the left to follow irregularities in the welding groove, oil or other pressure transmitting fluid is respectively forced into either cylinder 418 or cylinder 424 and is exhausted from the opposite cylinder to cause the welding machine to slide either to the left or the right to in turn follow the irregularities in the welding groove. Motor 394 drives pump 396 continuously. When pressure transmitting fluid is not being forced into either of the cylinders, it is returned to the tank through the pipe 406. Fluid exhausted from the cylinders passes through valve 410 and return line 414 to tank 392.

Figure 26:
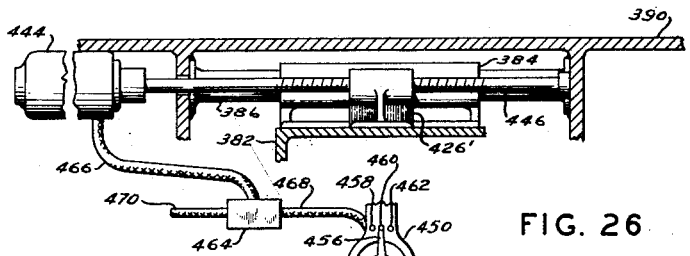
Fig. 26 shows a somewhat diagrammatic arrangement for electrically controlling the automatic guiding of the welding machine.

If desired, the automatic alignment and guiding of the welding machine may also be accomplished electrically by means of the structure shown in Fig. 26. As shown somewhat diagrammatically in this figure, an electric motor 444 is mounted upon the main support 390 and drives a threaded shaft 446 which cooperates with a threaded bracket 426' attached to the welding machine, generally designated 382. A guide wheel 246' is loosely mounted on a shaft 448 fixed between the arms of a forked support 450. A yoke 452 closely straddles the guide wheel 246' and is likewise loosely mounted on the shaft 448. Springs 454 are disposed between the arms of the yoke 452 and the arms of the forked support 450 to center the yoke and the guide wheel with respect to the support. Yoke 452 carries a contactor 456 adapted to engage any one of three contact points 458, 460, or 462 mounted on the forked support 450. A control relay 464 is mounted on any suitable part of the machine, or on a relatively fixed support, and multi-conductor cables 466 and 468 extend respectively between the motor 444 and the control relay 464, and between the control relay 464 and the forked support 450. A third multi-conductor cable 470 is used to conduct electric current from a source of supply to the relay 464.

The operation is as follows. When the contactor 456 engages the central contact point 460 all circuits between the relay 464, the motor 444, and the contactor 456 are open. If the guide wheel 246' moves to either the left or the right as viewed in Fig. 26, due to variations in the welding groove, the contactor 456 will engage either the contact point 458 or the contact point 462. When either one of these latter two contact points is engaged by the contactor 456, the motor is energized to rotate in a direction which causes the threaded shaft 446 to move the bracket 426, and the welding machine 382 to one side or the other of the center position to re-center the welding machine with respect to the guide wheel 246'. When the welding machine has moved a sufficient distance to re-center the machine with respect to the guide wheel, contact point 460 will be engaged by contactor 456 to thereby open all circuits for the motor 444. Thus the guide wheel 246' acts to keep the welding machine 382 automatically centered with respect to the welding groove.

The guiding mechanism shown in Fig. 17 may also be used to actuate a hydraulic or electric control mechanism as described in connection with Figs. 24, 25, and 26.

Figure 27:
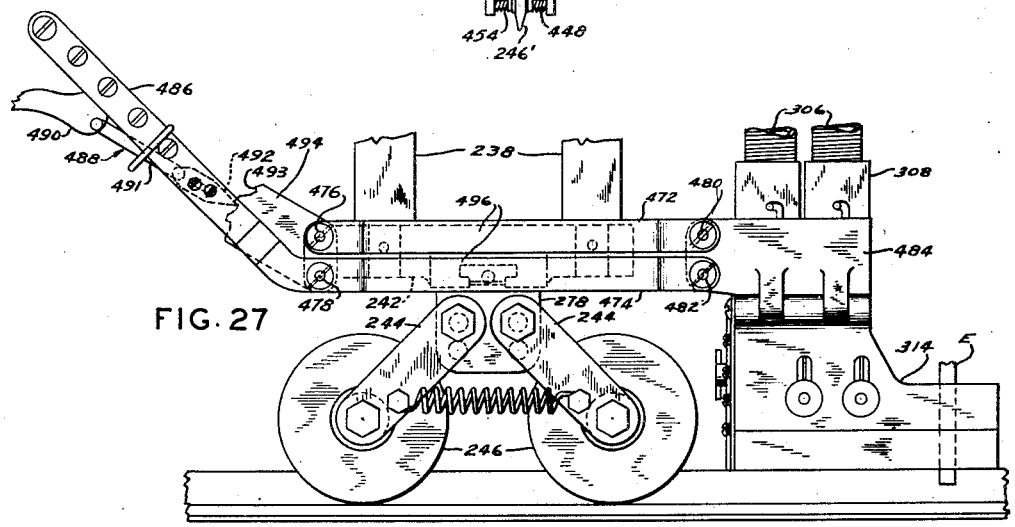
Fig. 27 is a side view of the lower portion of the machine shown in Fig. 13 illustrating an adjusting and positioning means for the welding material control gates.

It is oftentimes desirable to provide means for varying the relative vertical position of the welding material control gates 314 with respect to the guide wheels 246, or to allow these control gates to rise and fall vertically, as when welding on an uneven surface. A structure designed to accomplish this function is shown in Fig. 27, and comprises two levers 472 and 474 pivoted respectively as at 476 and 478 to the plate 242, and likewise pivoted respectively at 480 and 482 to a block 484 on which the conduits 306 for the welding material and the welding material control gates 314 are mounted. Two similar levers, correspondingly pivoted, are provided on the opposite side of the plate 242 from that shown in the figure. Levers 474 are provided with bent extensions 486 which cooperate to form an operating handle. Mounted in this operating handle is a latch mechanism 488 provided with an operating handle 490 connected by a link 491 to a dog 492 adapted to engage a series of teeth 493 formed on an extension 494 of the plate 242. The teeth 493 are spaced a considerable distance apart for a purpose to be later explained. Each one of the levers 472 and 474 is bent outwardly at its mid-portion 496 to clear the operating parts of the guide wheel shifting mechanism. In operation, the levers 472 and 474 act as "straight-line" mechanisms for raising the welding material control gate structure relatively to the guiding wheel structure and maintaining the control gate structure in properly aligned relationship to the welding seam. The latch mechanism 488, in cooperation with the teeth 493, maintains the two structures in relatively fixed relationship, but, due to the distance between the teeth 493, some vertical play is allowed the control gate mechanism so that the same may ride over any irregularities in the surface of the material being welded.

Figure 28:
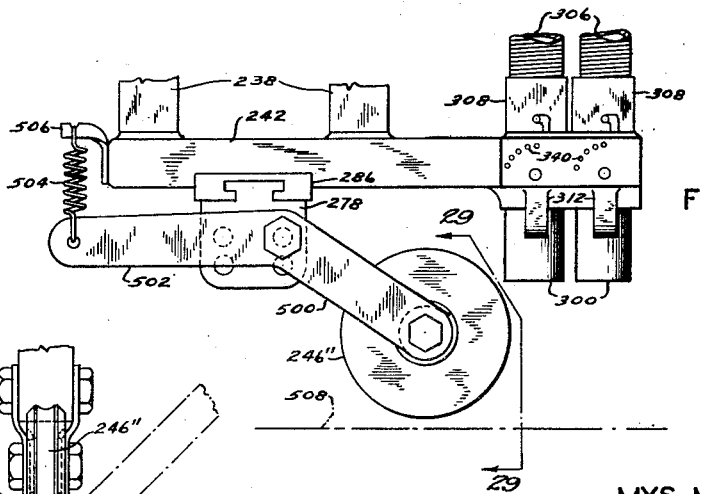
Fig. 28 is a side view of a modified form of guiding assembly particularly adapted for use in making fillet welds.
Figure 29:
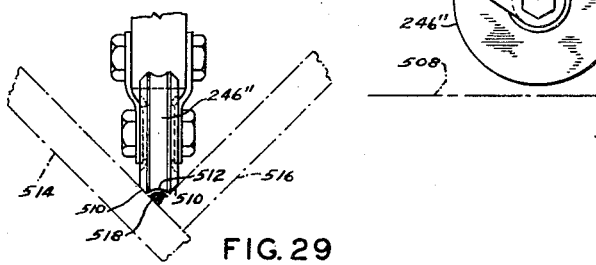
Fig. 29 is a view on the line 29—29 of Fig. 28, looking in the direction of the arrows.

A special type of guiding assembly for use in continuous fillet welding is illustrated in Fig. 28. In this particular assembly, the welding material control gates 314 are omitted, as the angle formed by the members to be welded will retain the welding material in place, and the single guide wheel 246" is disposed much closer to the distributing conduits 306, and hence to the welding point, than in the previously described modifications of the invention. Guide wheel 246" is mounted upon an arm 500 which is pivoted to the supporting block 278 mounted upon the supporting plate 242 and formed with a bent extension 502 to the end of which is attached a spring 504 which at its opposite end is attached to a notched bracket 506 connected to the plate 242. Reference line 508 represents the line of intersection of the two metal members between which the fillet weld is to be made. The guide wheel 246" shown in this figure is of a special construction as particularly disclosed in Fig. 29. As shown in this figure, the rim portion of the guide wheel comprises two axially spaced, bevelled work contacting portions 510 with a recessed portion 512 disposed therebetween. This guide wheel fits very closely into the angle formed by the metal members 514 and 516 which are temporarily held in place by a series of tack welds 518. The bevelled work contacting portions 510 of the guide wheel rim contact the metal members 514 and 516, having a line contact immediately adjacent each side of the tack welds, and the recessed center portion 512 of the rim portion is provided to enable the guide wheel 246" to clear the spaced tack welds 518 during the progress of the welding machine along the line of intersection of the metal member 514 and 516. Due to the shortened distance between the centers of the guide wheel and the welding material distributing tube assembly, the welding electrode follows any irregularities in the welding line very closely.

Figure 30:
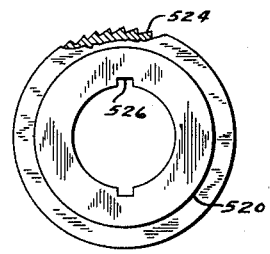
Fig. 30 is a side view of an electrode feeding roller for use with this invention.
Figure 31:
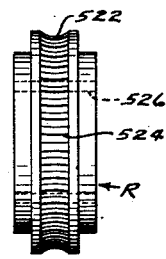
Fig. 31 is a front view of the structure disclosed in Fig. 30.

Various specific forms of the electrode feeding rollers R are shown in Figs. 30 to 33 inclusive. In Figs. 30 and 31, the roller R is shown as formed from a circular blank 520 T-shaped in cross-section. The contacting surface of the roller is formed by a circumferentially extending curved recess 522 in which are cut spaced teeth 524. Keyways 526 are provided to permit the roller to be keyed to its drive shaft.

Figure 32:
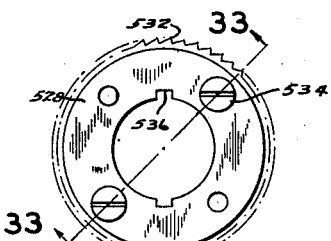
Fig. 32 is a side view of another form of an electrode feeding roller for use with this invention.
Figure 33:
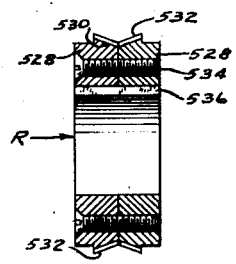
Fig. 33 is a section on the line 33—33 of Fig. 32.

In Figs. 32 and 33, the feed roller R comprises two identical circular blanks 528 cooperating to form a circumferentially extending, V-shaped central contact recess 530 in the rim of the roller provided with V-shaped teeth 532. The cooperating circular blanks are secured together by screws 534 and keyways 536 are provided to secure the roller to its driving shaft.

The circumferentially extending recessed contact portion formed in the feeding roller R, as shown in Figs. 30 to 33, is provided in order to allow the feeding rollers to accommodate welding electrodes of various diameters and insure that the rollers have a sufficient gripping action thereon. For instance, the roller shown in Figs. 30 and 31 is used with electrodes one-quarter inch and under in diameter, and that shown in Figs. 32 and 33 is used with electrodes larger than one-quarter inch in diameter. The recessed contact portion insures that the contact between the feeding roller and the electrode is more than a single point contact, as, in the modification shown in Figs. 30 and 31, there will be contact over an arc of considerable length, and, in the modification shown in Figs. 32 and 33, there will be two spaced points of contact between the electrode and the feeding roller. This results in a more positive gripping action between the electrode and its feeding roller than is possible with a roller provided with a straight line contact face.

Figure 34:
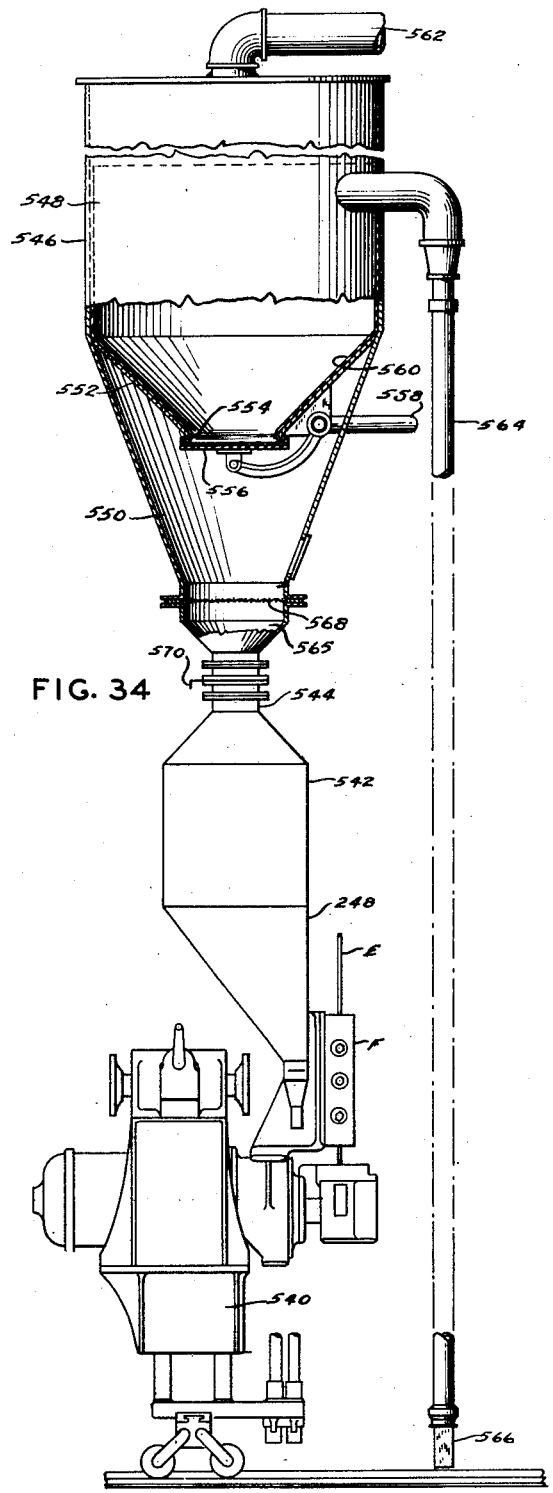
Fig. 34 is a view of the machine illustrated in Fig. 13 showing apparatus which may be used therewith for reclaiming unused granular welding material from the completed welded seam.

As pointed out in the early part of the specification, in the welding process with which this machine is particularly adapted for use, not all of the granular welding material deposited on the work is used. For reasons of economy, it is desirable to reclaim the unused portion of the welding material and a machine designed for attachment to any of the previously described modifications of the welding machine of the invention, and adapted to reclaim this unused welding material, is shown in Fig. 34. In this figure, a welding machine of the type shown in Fig. 13 and generally designated as 540 is shown as provided with a hopper 248 identical with the hopper shown in Fig. 11. An extension 542 is mounted on the hopper 248 and connected by a tube 544 to a second hopper 546. Hopper 546 is divided into an upper portion 548 and a lower portion 550 by a funnel-shaped partition 552 having a bottom opening 554 therein closed by a valve 556 which may be operated by a handle 558. The upper portion 548 is lined with rubber as at 560, and a conduit 562 extends from the top of the upper portion to a compressor, or any other suitable vacuum creating means, not shown. Also extending from the upper portion 548 of the hopper 546 is a conduit 564 provided at its lower edge adjacent the seam with a nozzle 566 which may be cut to conform to the shape of the pile of welding material on top of the seam as determined by the shape of the gates 328 shown in Figs. 14 and 15. Just above opening 565 in the lower portion 550 of the hopper 546 is a screen 568, and, disposed in the tube 544, connecting the hopper 546 with the extension 542 of the hopper 248, is a sliding control gate 570.

In operation, the entire machine shown in Fig. 34 moves from right to left as shown in this figure. The nozzle 566 is disposed far enough behind the welding region to insure that the completed seam has become relatively cool, and the vacuum created through the conduit 562 causes any unused welding material to flow upwardly through the conduit 564 to the upper portion of the hopper 546. By opening the valve 556 against the force of the vacuum in upper portion 548, this material will fall into lower portion 550 and sift through screen 568 into the tube 544. When the portion of the hopper 248 which contains the reclaimed welding material is nearly empty, the gate 570 is opened, and the reclaimed granular welding material enters the hopper 248 through the extension 542. It may then be reused in the welding process. The above described welding material reclaiming apparatus permits an added economy in the welding operation through the reuse of unused material which might otherwise be wasted. Obviously this reclaiming apparatus may be used with any of the previously described modifications of the invention.

Various changes may be made in the details of the several modifications disclosed herein without departing from the principles of the invention.

What is claimed is:

1. An electric welding head comprising, in combination, a movable support; an electric motor having a casing and suspended from said support; means, mounted on said casing and driven by said motor, for feeding a welding rod to a welding groove; and means supported by said casing and depending therefrom into engagement with said welding groove to guide said head along said welding groove.

2. In combination, a welding device; a movable support therefor; means hingedly suspending said device from said support for swinging movement about an axis parallel to and spaced from a line to be welded; and guide means secured to said device and adapted to engage said line to cause said device to follow said line during movement of said support.

3. In combination, a welding device; a movable support therefor; means hingedly suspending said device from said support for swinging movement about an axis parallel to and spaced from a welding groove; guide means secured to said device and adapted to engage said groove to cause said device to follow said groove during movement of said support; and means for adjusting said guide means laterally with respect to said welding device, whereby said welding device may be aligned accurately with said groove.

4. In combination, a welding device; a movable support therefor; means hingedly suspending said device from said support for swinging movement about an axis parallel to and spaced from a welding groove; guide means secured to said device and adapted to engage said groove to maintain said device positively in alignment with said groove during movement of said support; and means to lock said device against swinging movement on said support to maintain said device positively in alignment with said groove when said guide means has progressed longitudinally beyond the end of said groove.

5. In combination, a welding device; a movable support therefor; means hingedly suspending said device from said support for swinging movement in a plane transverse to the plane of movement of said support; guide means secured to said device and adapted to engage a welding groove to cause said device to follow said groove during movement of said support; and means for securing interchangeable guiding heads in said guide means for contact with welding grooves of various dimensions.

6. Means for making a continuous fillet weld between two metal members disposed at an angle to each other and held temporarily in place by spaced tack welds; said means including an electric welding head and means to guide said electric welding head along the line of intersection of said members, said guiding means being disposed substantially in alignment with said line of intersection and said spaced tack welds; portions of said guiding means having a line contact with each of said members immediately adjacent each side of said tack welds; and said guiding means being recessed between said contact portions, whereby said guiding means may traverse said line of intersection without interference from said tack welds.

7. In combination, an electric welding machine; a support therefor adapted to move said machine longitudinally with respect to a line to be welded; means hingedly suspending said machine from said support for swinging movement in a plane transverse to the plane of movement of said support; a hopper secured to said machine and adapted to contain a supply of granular welding material; conduit means secured to said hopper, the lower end of said conduit means being disposed immediately above said line to be welded, whereby said conduit means is adapted to deposit welding material from said hopper onto said line to be welded; welding rod feeding mechanism secured to said machine and adapted to feed a welding rod to the work at a point behind the lower end of said conduit means; and a guiding device secured to said machine and engaging said line to be welded at a point in advance of the lower end of said conduit means to maintain the lower end of said conduit means and said welding rod positively in alignment with said line to be welded and to cause the lower end of said conduit means and said welding rod to follow irregularities in said line to be welded by swinging said machine transversely of said line about its point of hinged suspension.

8. In the combination claimed in claim 7, mechanism for vertically adjusting the lower end of said conduit means with respect to said guiding device, said adjusting mechanism permitting a limited amount of vertical movement of the lower end of said conduit with respect to its adjusted position.

9. In an electric welding machine; electrode feeding means; means for depositing a supply of granular welding material on the work to be welded; and means to retain on the work a quantity of such deposited welding material having a predetermined contour and of predetermined dimensions.

10. In an automatic electric welding machine; means for unwinding from a reel and straightening an electrode adapted to pass through said machine; comprising opposing sets of rollers contacting opposite sides of said electrode; means for individually adjusting each roller of each set; driving means operatively engaging opposite sides of said electrode; means for adjusting the minimum spacing of said driving means; and means resiliently urging said driving means into engagement with said electrode.

11. In an automatic electric welding machine; means for feeding the electrode to the work; comprising a pair of oppositely disposed housings; a drive shaft extending into each of said housings; each housing being respectively pivotally supported by one of said drive shafts; means for adjusting the minimum spacing of said housings; a grooved roller rotatably mounted in each of said housings and spaced respectively from the drive shaft; means in each of said housings for connecting each of said rollers to its respective drive shaft, the grooves in said rollers contacting opposite sides of said electrode; and means resiliently urging said housings toward each other.

12. Electric welding apparatus comprising, in combination, a motor; a casing for said motor; a rod-straightening means supported on said casing; means connected to said casing and engaging said rod for drawing said rod through said rod-straightening means; a bracket secured to said casing and depending therefrom; a sleeve secured to said bracket and surrounding said rod; an arm secured to said sleeve; a plate secured to said sleeve and extending downwardly therefrom; a contact jaw fixedly mounted on said plate and engaging said rod; a second contact jaw movably mounted on said plate and engaging the opposite side of said rod; a lever pivotally connected to said fixed contact jaw and slidably and pivotally connected to said movable contact jaw and extending beyond said movable contact jaw; and resilient means connecting the end of said lever projecting beyond said movable contact jaw to said arm for urging said contact jaws into resilient engagement with said welding rod.

13. Electric welding apparatus comprising, in combination, a motor; means hingedly supporting said motor for swinging movement in a plane transversely of a welding line; electrode straightening and driving means connected to said motor; a support adjustably connected to said motor; means for adjusting the distance between said support and said motor; guiding means pivotally connected to said support and engaging said welding line; arms pivotally connected to opposite sides of said support and extending rearwardly therefrom; a pair of vertically extending plates pivotally connected to said arms and extending in parallel relation to said welding line on opposite sides thereof; a hopper for granular welding material secured to said motor; and conduits extending from said hopper to a point between said plates for depositing granular welding material on said welding line between said plates.

14. In the combination claimed in claim 13, a plate vertically adjustably connected to each of said first-named plates and extending at right angles thereto, transversely of the welding line, each of said plates being trapezoidal in shape and adapted to control the dimensions of the supply of granular welding material deposited on said welding line.

15. In combination, a welding rod driving and straightening mechanism; means hingedly supporting said mechanism for swinging movement transversely of a welding line; a support connected to said mechanism in vertically adjustable relation therewith; means for adjusting the vertical distance between said mechanism and said support; a member connected to said support and movable transversely thereof; guiding means connected to said member and engaging said welding line; a pair of plates hingedly connected to said support rearwardly of said mechanism in spaced parallel relation with said welding line; means for adjusting the transverse spacing of said plates; a second pair of plates each vertically adjustably connected to said first-named plates; said second-named plates being each provided with a beveled lower edge adjacent said welding line; a hopper connected to said mechanism and adapted to contain granular welding material; means extending downwardly from said hopper through said support and adapted to deposit granular welding material from said hopper on the welding line in the area enclosed by said plates, said plates being adapted to control the dimensions of the supply of granular welding material deposited on said welding line; and valves in said material depositing means for controlling the amount of material deposited on said welding line.

16. Electric welding apparatus comprising, in combination, a welding rod straightening and driving mechanism; a support adjustably secured to said straightening and driving mechanism; means for moving said support vertically with respect to said mechanism; a horizontally extending arm secured to said support; means for moving said arm transversely of said support; a sleeve secured in one end of said arm; a second sleeve telescopically disposed in said first sleeve; resilient means normally urging said sleeves to separate; a threaded shaft extending vertically through said second sleeve; and a spherical member mounted on the lower end of said threaded shaft and adapted to engage a welding groove to guide said straightening and driving mechanism therealong.

17. Welding apparatus comprising, in combination, a welding rod straightening and driving mechanism; a support adjustably secured to said mechanism; means for vertically adjusting said support on said mechanism; an L-shaped bracket extending through said support transversely of a line to be welded, with one arm of said bracket extending downwardly adjacent an edge of the members to be welded; means for maintaining said bracket substantially centrally of said support; a wheel mounted on said support and adapted to engage the upper surface of the members to be welded; and a roller mounted on the downwardly extending arm of said bracket for rotation in a horizontal plane and adapted to engage said edge of the members to be welded to guide said mechanism along the line to be welded.

MYS M. LEWBERS.